United States Patent [19]

Ishiwari et al.

[11] Patent Number: 5,041,500

[45] Date of Patent: Aug. 20, 1991

[54] HETEROGENEOUS FLUORINE-CONTAINING POLYMER BLEND COMPOSITION

[75] Inventors: Kazuo Ishiwari, Ibaraki; Tsuyoshi Noguchi, Settsu, both of Japan

[73] Assignee: Daikin Industries, Ltd., Osaka, Japan

[21] Appl. No.: 412,214

[22] Filed: Sep. 25, 1989

[30] Foreign Application Priority Data

Oct. 7, 1988 [JP] Japan .................. 63-254560

[51] Int. Cl.$^5$ ............. C08L 27/20; C08L 27/18; C08L 27/12
[52] U.S. Cl. ............................... 525/200; 525/197
[58] Field of Search ................ 525/200, 199

[56] References Cited

U.S. PATENT DOCUMENTS

| | | | |
|---|---|---|---|
| 4,105,716 | 8/1978 | Sakai et al. | 525/276 |
| 4,208,472 | 6/1980 | Cho et al. | 428/422 |
| 4,555,543 | 11/1985 | Effenberger et al. | 525/199 |
| 4,713,418 | 12/1987 | Logothetis et al. | 525/199 |
| 4,749,752 | 6/1988 | Voulu et al. | 525/199 |
| 4,792,117 | 12/1988 | Kubota | 525/199 |

FOREIGN PATENT DOCUMENTS

| | | |
|---|---|---|
| 057656 | 11/1978 | Japan . |
| 55-025415 | 2/1980 | Japan . |
| 829600 | 3/1960 | United Kingdom . |

*Primary Examiner*—Carman J. Seccuro
*Attorney, Agent, or Firm*—Birch, Stewart, Kolasch & Birch

[57] ABSTRACT

A heterogeneous meltable fluorine-containing polymer blend composition which comprises a tetrafluoroethylene/hexafluoropropylene copolymer and a copolymer of tetrafluoroethylene and at least one fluorovinyl ether of the formula:

$$CF_2=CF-O-R_f \qquad (I)$$

wherein $R_f$ is a fluoroalkyl group having 1 to 10 carbon atoms, which is easily molded and provides an article having good mechanical properties.

5 Claims, 3 Drawing Sheets

HETEROGENEOUS FLUORINE-CONTAINING POLYMER BLEND COMPOSITION

BACKGROUND OF THE INVENTION

1. Field of the Invention

The present invention relates to a heterogeneous meltable fluorine-containing polymer blend composition. More particularly, the present invention relates to a heterogeneous meltable fluorine-containing polymer blend composition comprising a tetrafluoroethylene/hexafluoropropylene copolymer and a copolymer of tetrafluoroethylene and a fluorovinyl ether.

2. Description of the Related Art

Blends of polymers are attractive in view of an improvement of properties of known polymers or development of new properties, and as a result, many polymer blends have been proposed.

However, no polymer blend of meltable fluorine-containing polymer is known.

SUMMARY OF THE INVENTION

An object of the present invention is to provide a novel blend of heterogeneous meltable fluorine-containing polymers.

Accordingly, the present invention provides a heterogeneous meltable fluorine-containing polymer blend composition which comprises a tetrafluoroethylene/hexafluoropropylene copolymer (hereinafter referred to as "FEP") and a copolymer of tetrafluoroethylene and at least one fluorovinyl ether of the formula:

$$CF_2=CF-O-R_f \quad (1)$$

wherein $R_f$ is a fluoroalkyl group having 1 to 10 carbon atoms (hereinafter this copolymer will be referred to as "PFA").

DETAILED DESCRIPTION OF THE INVENTION

Figure 2:
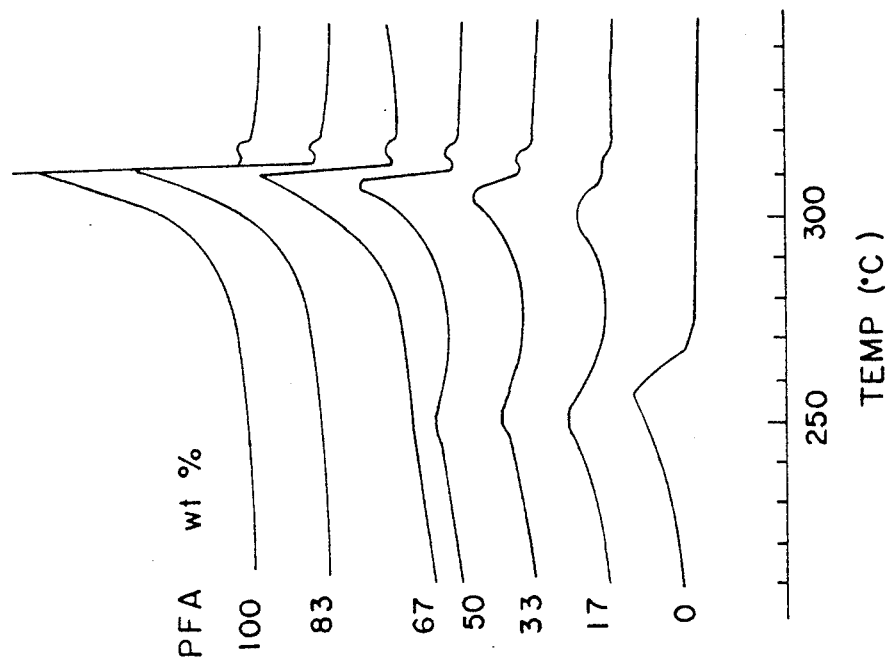
FIGS. 2 and 3 are graphs showing the melting behavior of the PFA/FEP blends measured with the DSC.

In the composition of the present invention, the difference of the melt viscosity between two copolymers is preferably less than 20,000 poise, more preferably not more than 15,000 poise.

The melt viscosity of the copolymer is measured by using a capillograph manufactured by Toyo Seiki Seisakusyo. That is, a capillary having a diameter of 1.00 mm and a length of 20.00 mm is used and shear stress is measured at the measurement temperature of from 350° C. to 380° C. and the shear rate of 6.08 sec$^{-1}$. Melt viscosity is calculated as a ratio of the shear stress to the shear rate.

FEP preferably comprises 96 to 87% by weight of tetrafluoroethylene and 4 to 13% by weight of hexafluoropropylene. PFA preferably comprises 99.5 to 92% by weight of tetrafluoroethylene and 0.5 to 8% by weight of the fluorovinyl ether (I).

The composition of the present invention preferably comprises 90 to 10% by weight of FEP and 10 to 90% by weight of PFA, more preferably 80 to 20% by weight of FEP and 20 to 80% by weight of PFA.

FEP or PFA can contain other comonomers in such an amount that these other comonomers do not decrease the properties of FEP and PFA. Specific examples of these other comonomers are hexafluoropropylene (in PFA), perfluoro($C_1$-$C_{10}$-alkyl vinyl ether) (in FEP), perfluoro-$C_1$-$C_{10}$-alkyl ethylene perfluoro(alkyl allyl ether), and the compound of the formula:

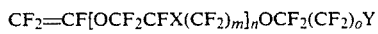

$$CF_2=CF[OCF_2CFX(CF_2)_m]_nOCF_2(CF_2)_oY$$

wherein X is fluorine or trifluoromethyl, Y is halogen, m is 0 or 1 (when m is 1, X is fluorine), n is 0 to 5, and o is 0 to 2.

FEP and PFA are mixed by any of the conventional methods, for example, blended in the form of aqueous dispersions, blended in the form of organic solvent dispersions or blended in the form of dry powder or melt blended in melt extrusion.

PREFERRED EMBODIMENTS OF THE INVENTION

Example

PFA containing 2.5% by weight of perfluoro(propyl vinyl ether) and having the melt viscosity of 25,000 poise and FEP containing 8.0% by weight of hexafluoropropylene and the melt viscosity of 40,000 poise were blended by dispersion blending.

That is, the dispersions of PFA and FEP were mixed in a predetermined ratio and stirred. Then, the mixed dispersion was dropwise added into 20 % nitric acid to coagulate the polymers followed by washing with water and drying.

According to light scattering, each of PFA and FEP had an average particle size of 0.15 μm in the dispersion. This average particle size indicated that each polymer had good dispersibility in the medium.

The glass transition temperatures of the blends of PFA and FEP having different compositions were measured to find the dependency of glass transition temperature of the blend on the composition. The glass transition temperature was measured with a differential scanning calorimeter (DSC) on the blend sample which had been treated by keeping it at 350° C. for 10 minutes and then quenching it. The results are shown in FIG. 1.

Figure 1:
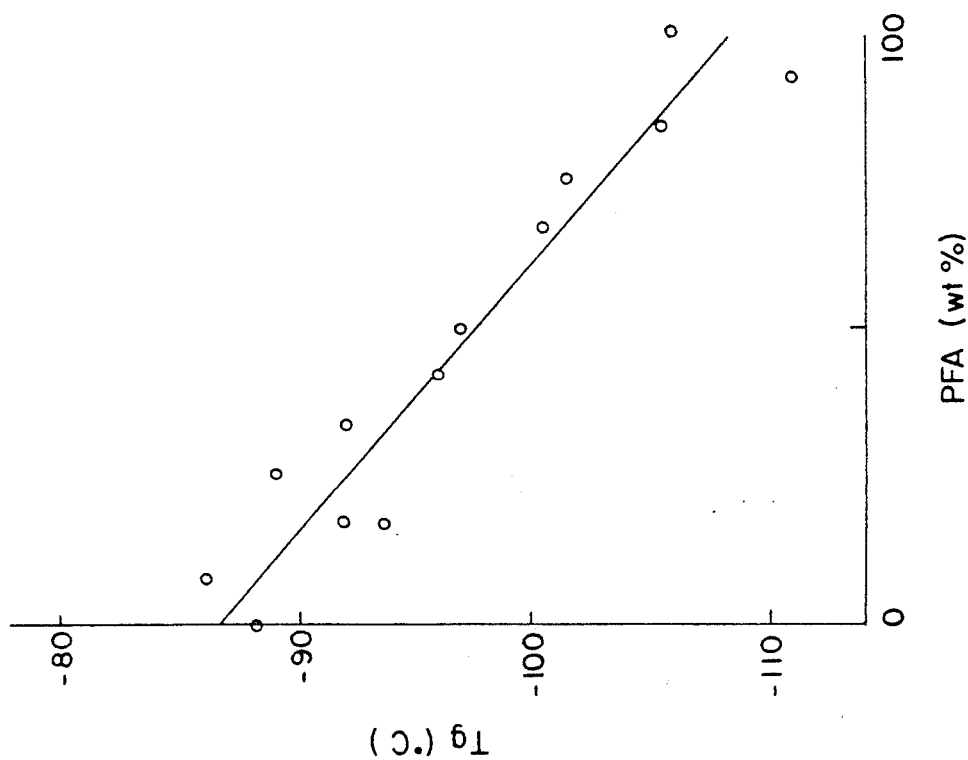
FIG. 1 is a graph showing the dependency of the glass transition temperature of the PFA/FEP blends on the compositions.

From the results of FIG. 1, the glass transition temperature of the blend linearly changed in the temperature range between −120° C. and −90° C., which indicates that PFA and FEP are compatible with each other in an amorphous region.

FIG. 2 shows DSC melting behavior of the blends. From the results of FIG. 2, it is understood that each blend has the melting peaks corresponding to PFA and FEP and does not form a mixed crystal. However, each melting point was decreased due to the blending. On crystallization, the crystallizing temperature of PFA crystal decreased significantly.

Figure 3:
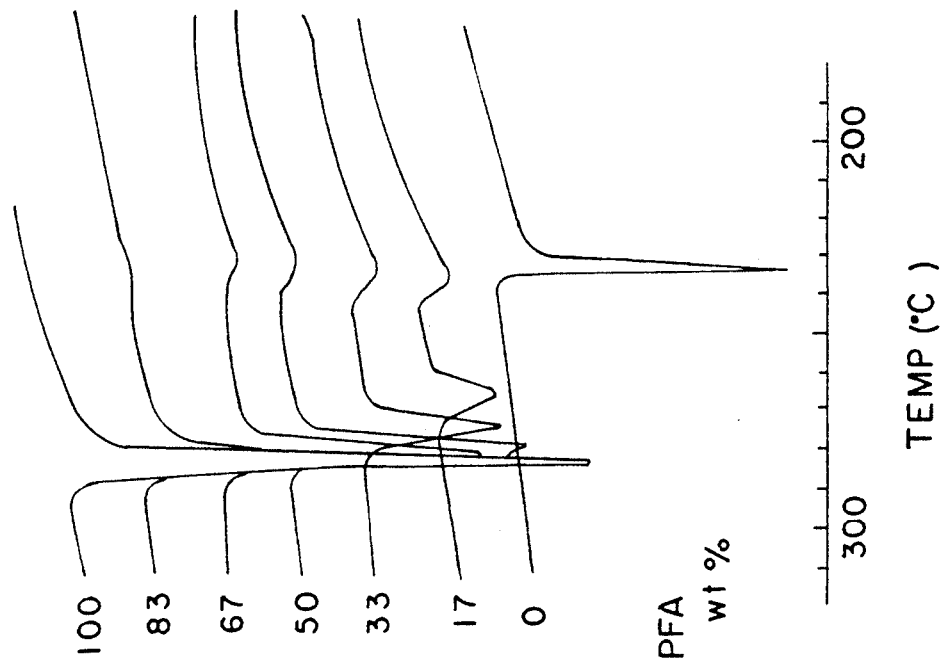

The exothermic peaks for PFA and FEP were broadened, which had great influence on the crystallizing rate (see FIG. 3).

When the transition enthalpy ΔH are calculated from the results shown in FIG. 2, it is found that the transition enthalpy is greatly decreased by blending and the decrease of crystallinity is found. This is particularly so in the PFA rich portion in which ΔH for FEP is nearly zero (0).

The diffraction angle for the (100) plane in the X-ray diffraction substantially linearly changed with the change of composition.

Suppose that the crystalline state in the blend is the same as in the pure polymer and the amount of the crystal changes in proportion to the enthalpy of fusion ΔH. Since ΔH of the FEP part in the above PFA rich portion is nearly zero, the X-ray diffraction angle in said portion might be substantially the same as pure PFA. However, the diffraction angle linearly changed with the composition, which is contrary to the result of DSC measurement. This suggests that FEP and PFA crystals would not form mixed crystal but their crystalline states would be rather disturbed in comparison to those of pure polymers.

The crystalline transition found in PTFE at 19° C. due to change of helix period is found at 0° C. in PFA while it disappears in FEP. The crystalline transition shifts to the low temperature side in the blends. This may be due to the disturbance in the PFA crystals in the blends.

Figure 4:
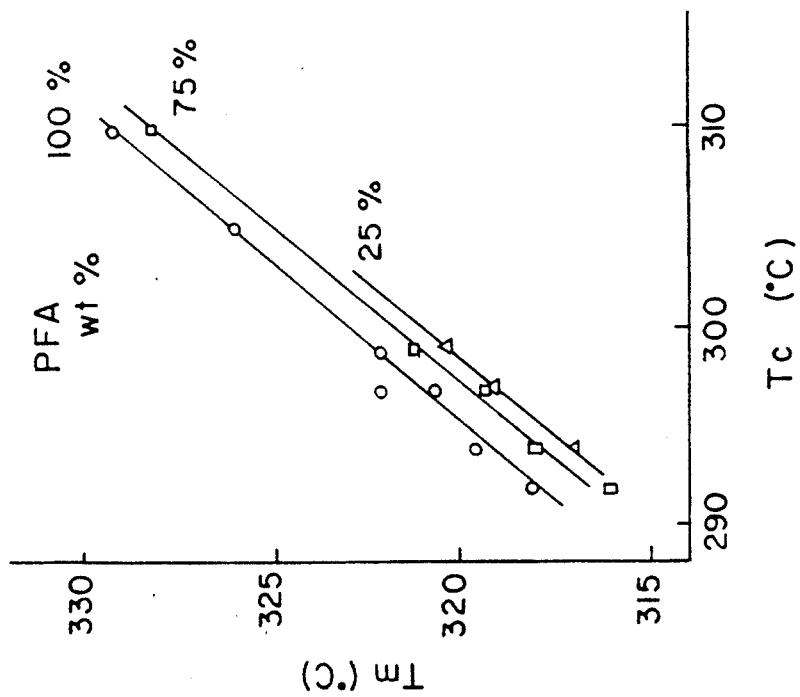
FIG. 4 is a graph showing the relationship between $T_c$ and $T_m$ of the isothermally crystallized sample.

The blend sample having been kept at 350° C. in the DSC was isothermally crystallized by cooling to an arbitrary temperature. The relationship between the crystallizing temperature $T_c$ and the melting point $T_m$ is shown in FIG. 4. In each composition, the relationship is linear and its slope is constant irrespective of the compositions.

The morphology factor $\phi$ which is calculated according to the following equation (1) was 0.6, which is reasonable for the polymer:

$$T_{m'} - T_m = \phi(T_m - T_c) \tag{1}$$

in which $T_{m'}$ is an equilibrium melting point, $T_m$ is a melting point and $T_c$ is a crystallization temperature.

Figure 5:
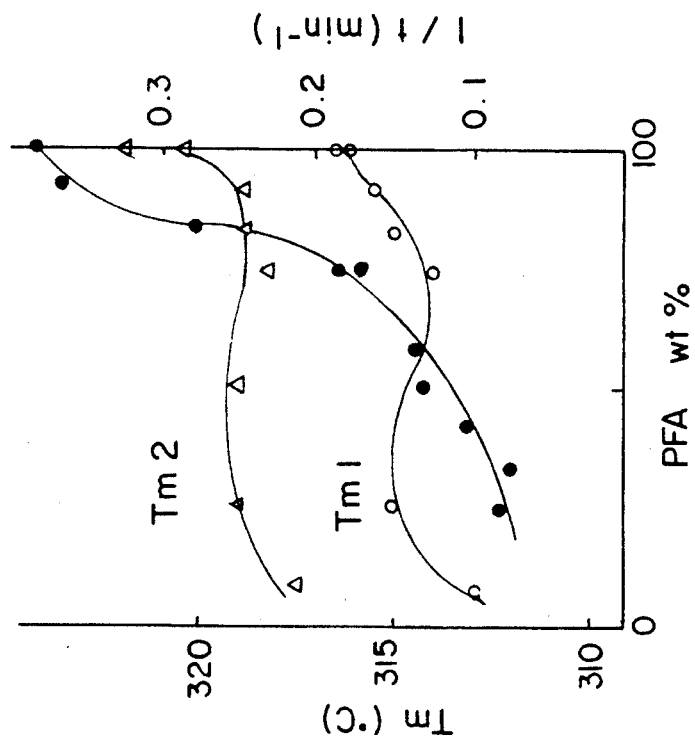
FIG. 5 is a graph showing the dependency of the crystallizing rate in the isothermal crystallization and the melting point on the composition.

When the Flory-Huggins-Scott (FHS) theory was applied to the dependency of the equilibrium melting point on the composition, the plots fell on a line but said line deviated from the origin. Then, it is difficult to apply the FHS theory to the blends. This may be because the lowering of melting point in the FEP poor region would be larger than the theoretically expected value in comparison to other composition regions. This corresponds to the lowering of PFA melting point of the isothermally crystallized sample at 297° C. due to the presence of a small amount of FEP, which is shown in FIG. 5. In FIG. 5, the triangles represent the peak temperatures $T_{m1}$ in the DSC chart, and the white circles represent the temperature $T_{m2}$ at the intercepts on the base line at the high temperature side. The $T_{m1}$ may show the average of the melting temperatures, and the $T_{m2}$ may shown the melting point of the crystal having the best completeness.

The crystallizing rate of PFA was significantly decreased due to the presence of a small amount of FEP (see the black circles in FIG. 5 which represent 1/t). These results suggest that the morphology of the crystal in the blend was influenced by the equilibrium factor more than the kinetics factor. That is, to crystallize PFA from the melt state in which PFA and FEP are compatible with each other, FEP should be excluded as the PFA crystal grows. Then, the presence of FEP seems to delay growth of the PFA crystal. However, a few FEP molecules may be trapped in the PFA crystal in view of the relationship between a crystal growth rate and a rate of molecular movement, and such the trapped molecules may disturb the crystal. This is supported by the results of X-ray diffraction. In such case, not only the crystallizing rate but also the size of crystal may be influenced.

Figure 6:
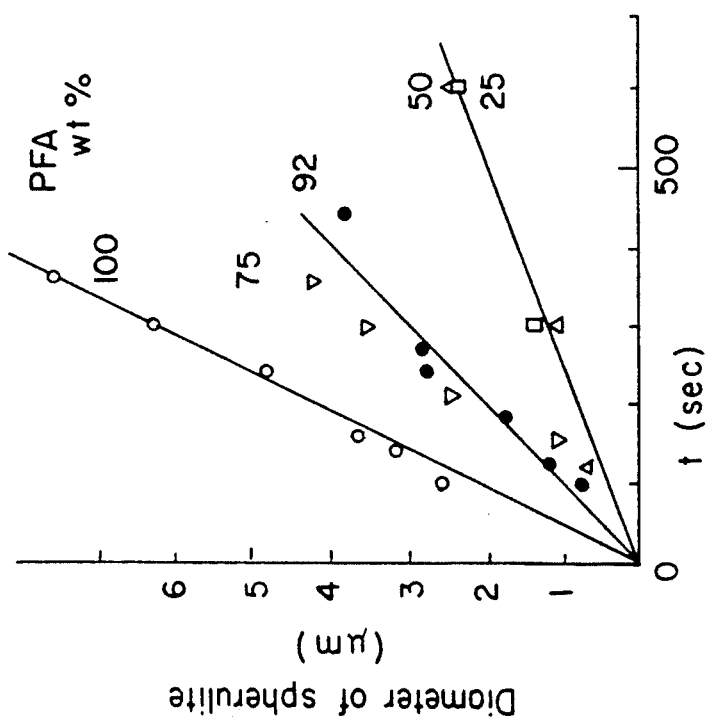
FIG. 6 is a graph showing the growth of the PFA spherulite in each blend sample.

PFA forms a spherulite as the higher order crystalline structure while FEP does not. Therefore, the dependency of the growth rate of PFA spherulite on the composition was studied by measuring said rate with a polarized light microscope. The results are shown in FIG. 6. The slope of the line corresponds to the growth rate. It is found that the growth of the PFA crystal is much hindered by the presence of a small amount of FEP.

In the FEP/PFA blend composition, the both polymers are compatible with one another, the crystallizing temperature of the composition is lowered, the crystallizing rate is significantly reduced and the degree of crystallinity is decreased. As the result, the temperature control during molding becomes easy and the dimensional change of the molded article is suppressed. Less molding strain remains so that cracking of the article can be suppressed. Therefore, the blend composition of the present invention is particularly suitable for molding a thick-walled article. The molded article from the FEP/PFA blend composition has good flex resistance and tension resistance.

What is claimed is:

1. A heterogeneous meltable fluorine-containing polymer blend composition which comprises a copolymer comprising 96 to 87% by weight of tetrafluoroethylene and 4 to 13% by weight of hexafluoropropylene and a copolymer comprising 99.5 to 92% by weight of tetrafluoroethylene and 0.5 to 8% by weight of at least one fluorovinyl ether of the formula:

$$CF_2=CF-O-R_f \tag{I}$$

wherein $R_f$ is a fluoroalkyl group having 1 to 10 carbon atoms.

2. The heterogeneous meltable fluorine-containing polymer blend composition according to claim 1, wherein difference of melt viscosity between the copolymer of tetrafluoroethylene and hexafluoropropylene and the copolymer of tetrafluoroethylene and the fluorovinyl ether (I) is less than 20,000 poise.

3. The heterogeneous meltable fluorine-containing polymer blend composition according to claim 1, which comprises 90 to 10% by weight of the copolymer of tetrafluoroethylene and hexafluoropropylene and 10 to 90% by weight of the copolymer of tetrafluoroethylene and the fluorovinyl ether (I).

4. The heterogeneous meltable fluorine-containing polymer blend composition according to claim 1, which comprises 80 to 20% by weight of the copolymer of tetrafluoroethylene and hexafluoropropylene and 20 to 80% by weight of the copolymer of tetrafluoroethylene and the fluorovinyl ether (I).

5. The heterogeneous meltable fluorine-containing polymer blend composition according to claim 2, wherein the melt viscosity difference is less than 15,000 poise.

* * * * *